United States Patent
Tan

(10) Patent No.: US 9,792,452 B2
(45) Date of Patent: Oct. 17, 2017

(54) PERVASIVE INTERMEDIATE NETWORK ATTACHED STORAGE APPLICATION

(71) Applicant: Anthony Tan, Las Vegas, NV (US)

(72) Inventor: Anthony Tan, Las Vegas, NV (US)

( * ) Notice: Subject to any disclaimer, the term of this patent is extended or adjusted under 35 U.S.C. 154(b) by 82 days.

(21) Appl. No.: 14/485,506

(22) Filed: Sep. 12, 2014

(65) Prior Publication Data
US 2016/0078237 A1  Mar. 17, 2016

(51) Int. Cl.
G06F 21/62 (2013.01)
G06F 3/06 (2006.01)
G06F 17/30 (2006.01)

(52) U.S. Cl.
CPC .......... *G06F 21/62* (2013.01); *G06F 3/0605* (2013.01); *G06F 3/067* (2013.01); *G06F 3/0643* (2013.01); *G06F 3/0665* (2013.01); *G06F 17/30197* (2013.01); *G06F 2206/1008* (2013.01)

(58) Field of Classification Search
CPC .......... G06F 11/00; G06F 12/14; G06F 12/16; G06F 23/00; G06F 7/04; G06F 17/30; G08B 23/00; H04N 7/16
USPC .......................................................... 726/28
See application file for complete search history.

(56) References Cited

U.S. PATENT DOCUMENTS

| | | | |
|---|---|---|---|
| 2005/0144195 A1* | 6/2005 | Hesselink | H04L 63/0209 |
| 2012/0221636 A1* | 8/2012 | Surtani | H04L 12/6418 709/204 |
| 2013/0091188 A1* | 4/2013 | Du | H04L 67/1097 707/827 |
| 2013/0185384 A1 | 7/2013 | Menon | |
| 2013/0304866 A1* | 11/2013 | Wu | H04L 67/1097 709/219 |
| 2013/0311597 A1* | 11/2013 | Arrouye | G06F 9/5072 709/217 |
| 2014/0040811 A1 | 2/2014 | Brahmanapalli | |
| 2014/0181354 A1* | 6/2014 | Yi | G06F 13/4022 710/313 |
| 2015/0006596 A1* | 1/2015 | Fukui | G06F 17/30174 707/831 |
| 2015/0341466 A1* | 11/2015 | Sah | H04L 67/327 707/770 |

* cited by examiner

*Primary Examiner* — Hadi Armouche
*Assistant Examiner* — Sakinah Taylor
(74) *Attorney, Agent, or Firm* — Lightbulb IP, LLC

(57) ABSTRACT

A Pervasive Intermediate Network Attached Storage Application (PINApp) enables users to digitally assign (pin/tack) a folder or drive to a public cloud storage service for the purpose of sharing their digital content with others. The PINApp enables users to engage the cloud storage services without the need to upload the digital content to the cloud in order for it to be viewed or shared. The PINApp can be used to unify all of the digital content stored on multiple devices and cloud services for a single owner or user.

13 Claims, 7 Drawing Sheets

PERVASIVE INTERMEDIATE NETWORK ATTACHED STORAGE APPLICATION

BACKGROUND OF THE INVENTION

1. Field of the Invention

This invention relates to connecting a folder or hard drive on a personal computing device to a public cloud service for the purpose of sharing digital content such as songs, pictures, videos, documents and other digital content, negating the need to upload the digital content to the public cloud.

2. Related Art

The devices, features, and functions described herein are intended to disclose a method to allow a folder hosted on a local device such as a personal computer or other smart-type device to be digitally associated with, or "pinned or tacked" to a public cloud service. Unlike existing "Network Attached Storage" (NAS) or "Personal Cloud Devices" (PCD), there is no hardware requirement beyond the use of a computer, smartphone or other computing device capable of accessing a public cloud service on the Internet. While NAS and PCD-type devices exist within the prior art, they rely on expensive hardware, firmware and other device-centric components to establish the network connectivity and enable a user to connect and share digital content (files, folders, videos, songs, pictures, etc.) through a public or private cloud service.

The Pervasive Intermediate NAS application (PINApp) described herein addresses the need for an efficient, cost effective and simple way for users to store and share their digital content using public cloud services, without the requirement to upload their digital content to the public cloud, and without the requirement to purchase an expensive NAS or PCD. Further, the PINApp negates the need for expensive cloud storage service subscription plans because digital content is stored on the user owned/managed device and not on the public cloud.

The PINApp creates a digital environment wherein a user can store their digital content on a device they own (computer, smartphone, tablet, etc.) and both access and share that digital content through a public cloud service without the need to upload the digital content to the cloud.

By allowing users to share their digital content without the need to upload it to the public cloud, the PINApp negates the need for expensive cloud storage subscription services. Further, the PINApp eliminates the need for a personal appliance such as a PCD or NAS device (such as a WESTERN DIGITAL "My Cloud") as the functional aspects of the NAS are hosted within the PINApp contained on the owner device (computer, smartphone, tablet, etc.) provided by the digital content owner. The PINApp significantly reduces the cost associated with storing and sharing digital content in the public cloud.

In one preferred embodiment, the PINApp enables the user to select a folder on a local computing device (such as a tablet, smartphone, pc or other) that can be associated digitally with a public cloud storage service. This "pinning or tacking" of a locally hosted folder to a public cloud allows the PINApp to utilize a user's existing cloud service provider to share digital content with recipients. By allowing a folder to be pinned or tacked to a public cloud service (like DROPBOX or STOAMIGO), more users can access and share digital content, while negating the need to subscribe to expensive cloud storage service contracts, or worry about the fee's associated with storage space in the cloud. Further, by pinning or tacking a folder that is physically located on the device owned by the user and not by the cloud provider, the digital content remains private, protected and in the direct control of the owner of the digital content, and not in the control of the cloud service provider.

The PINApp allows the user device to act as a NAS device, wherein digital content can be stored "off-cloud". This enhances the privacy and security aspects of the user digital content because it is not being hosted on a public cloud or server farm. Even if a user pins or tacks a folder to a public cloud service and shares the content of, or the entire folder with one or more recipients, the digital content remains on the user device in the sequestered NAS storage portion and is not uploaded to the public cloud, unless the user wishes to do so.

Prior art systems do not lend themselves to portability and do not address the need for a digital solution to enable sharing of digital content through public cloud services, without uploading the digital content to the specified public cloud service. Further, existing NAS-type devices are large, expensive and out of the financial reach of many cloud users. The PINApp negates the need for these physical NAS-type devices, while enabling digital content to be pinned or tacked from a local user device (such as a personal computer, smartphone or tablet) directly to the public cloud, protecting and restricting access to the digital content by others, while allowing the digital content owner to share with family and friends.

The PINApp can also be used as a unification software tool to allow one existing cloud storage service (DROPBOX as an example) to be pinned or tacked directly to another (such as STOAMIGO). The unification of these separate services would take place through the PINApp, utilizing a series of digitally associated folders. While the cloud storage services are entirely separate and managed independently, the PINApp can be utilized to unify two or more services for a user within their personal device(s). This would enable a user to (as an example) share a Google Drive folder or file with a Google Drive user, from STOAMIGO's file storage and sharing platform.

The PINApp allows a user to select a "primary" and "secondary" public cloud service, wherein the user interface and command set of the primary public cloud service would be utilized to manage the digital content. The secondary public cloud service would appear in the primary public cloud service user interface screen as a folder, hosted within the primary public cloud service.

The PINApp utilizes the public API (Application Program Interface) provided by the public cloud storage services to enable digital content to easily be managed between two or more separate services from a user owned and managed device, such as a personal computer, laptop, smartphone or other smart-type computing device. The PINApp bridges the gap between the services, allowing the management of digital content to take place.

From the discussion that follows, it will become apparent that the present invention addresses the deficiencies associated with the prior art while providing additional advantages and benefits not contemplated or possible with prior art constructions.

SUMMARY OF THE INVENTION

A Pervasive Intermediate Network Attached Storage Application (hereinafter "PINApp") is described herein. The PINApp enables a user of a computing device (personal computer, smartphone, tablet, etc.) to designate a digital storage repository (file, folder, USB stick or other connected internal or external drive) to connect to the public cloud for the purpose of sharing their digital content. In one preferred embodiment, the PINApp may be downloaded and installed on a personal computing device such as a smartphone or a tablet, and be used to allow the owner of the smartphone or tablet to share their photos with another person. The PINApp would negate the need for the user to email or otherwise transfer their photos to the cloud, and enable them to share the photos directly with friends and family from their device using existing cloud storage and sharing services. By allowing users to share their digital content directly from their device, the PINApp negates the need for users to purchase expensive Local Area Network (LAN) connected PCD's or to subscribe to expensive cloud services. The PINApp allows the user to utilize the storage space on their computing device (or otherwise connected to their device such as an external hard drive) instead of the cloud or PCD storage space, saving upload time and the cost associated with paying for online (cloud) storage space or NAS devices and other "personal cloud" type devices.

The PINApp has two distinct and primary functions. The first is the ability to digitally associate or pin/tack a local folder or device to a public cloud storage system (such as STOAMIGO, DROPBOX and others) to enable a user to access and share digital content that is stored on a local device (such as a hard drive, thumb drive, laptop, smartphone or other) through a public cloud storage service, negating the need to upload the digital content to the cloud to be accessed and shared. The second primary function of the PINApp is to allow the association (or pinning/tacking) of folders and digital content stored on one public cloud storage service (such as DROPBOX) with another public cloud storage service (such as STOAMIGO). More specifically, the PINApp allows a user to unify their cloud storage services by assigning a primary (such as STOAMIGO) to enable the sharing and storage of digital content that is hosted on a secondary (such as DROPBOX). The digital content hosted on a secondary (such as DROPBOX) is not copied, moved or otherwise relocated to the primary (such as STOAMIGO), rather a folder is placed in the primary (such as STOAMIGO) to digitally associate the content stored on the secondary (such as DROPBOX) with the primary (such as STOAMIGO). Functionally, this relationship is managed by pinning or tacking the digital content stored in the secondary (such as DROPBOX) to the primary (such as STOAMIGO). By unifying these public cloud storage services, a user could engage in sharing and accessing digital content stored in one or more online locations (such as in DROPBOX) through the user interface of their primary or host service (such as STOAMIGO). Again, it's important to note that in either functional instance wherein a local folder is pinned or tacked to a public cloud storage service, or wherein the digital content of a secondary cloud storage is pinned or tacked to a primary cloud storage service, digital content is not moved, copied or otherwise relocated. The PINApp provides addressing information to associate the digital content stored across multiple platforms and devices so that it may be accessed via a single user interface on a chosen digital medium, such as a cloud storage service (i.e. STOAMIGO, DROPBOX, etc.).

In one preferred embodiment referencing the first primary function, the PINApp allows the user to digitally assign (or pin/tack) a folder that is hosted on their computing device directly to the public cloud. This "pinned" or "tacked" folder enables the user to place digital content into the folder to be accessed and shared directly through the public cloud, negating the need for a designated PCD or NAS device. The digital content that is stored in the pinned/tacked folder can be shared with one or more recipients through a publicly available cloud storage provider, but will remain on the local device, ensuring both privacy and security of the digital content. By allowing the digital content to be stored locally and not uploaded to the cloud, the PINApp bypasses expensive cloud storage service agreements because the PINApp negates the need to utilize the cloud service provider storage space. All of the digital content is stored on the device of the user/owner initiating the PINApp.

Digital content that is stored locally (as referenced above) can be accessed through the user interface of the public cloud service in which the folder or drive was pinned/tacked to. Specifically, if a user pins or tacks a folder from their smartphone to their StoAmigo cloud storage account, the pinned/tacked folder (hosted on their smartphone) will be accessible through the user interface of their StoAmigo cloud storage account. The digital content stored within the pinned/tacked folder will be accessed and managed as if it was being hosted on the public cloud storage service (StoAmigo) even though it is located on the users personal device (in this example a smartphone).

The PINApp bridges the privacy and security gap that currently exists within the cloud storage marketplace. Currently, sharing through the cloud is managed by either (a) uploading digital content to a cloud-based server, or (b) purchasing an expensive PCD or NAS device to connect to a private LAN at a home or office to facilitate sharing with one or more recipients through an existing cloud service provider.

The PINApp is a fully contained software algorithm and application that takes the place of the expensive NAS and PCD's by enabling users to share with and through public cloud systems, while ensuring the privacy and security of storing their digital content on a local device. Locally storing digital content ensures that it doesn't end up on a backup server in a cloud network where it can easily be accessed by other parties.

Specifically, many companies are developing PCD's to share digital content over the Internet. While these devices perform the basic functions to enable storage and sharing of digital content, the expense associated with purchasing these devices is a significant barrier to entry into the cloud market for users who do not have the financial capability to purchase these devices, yet need the privacy and security of keeping their digital content on their personal-user device while still sharing that content with recipients. Further, many of these devices are technically cumbersome to properly install and configure, causing many users to see other solutions to safely sharing digital content through the public cloud.

In one preferred embodiment, the PINApp can digitally assign a portion of the digital storage or memory on the computing device to function like a NAS device, enabling easy access as well as sharing, streaming, transmitting and receiving of digital content between parties. The PINApp addresses additional specific needs, including but not limited to, providing a safer and more secure way to share digital content using existing cloud service providers, while lowering the overall cost to do so.

As will be detailed below, the PINApp provides an alternative to traditional hardware centric NAS devices commonly sold and marketed as "Personal Cloud Devices" or "Private Clouds", while enhancing the overall security of digital content being stored, shared and/or accessible within a digital environment.

In another preferred embodiment referencing the second primary function of the PINApp, the PINApp can be used to digitally associate (or pin/tack) a folder hosted on a public cloud storage service (like DROPBOX) to another public cloud storage service (like STOAMIGO). The purpose of this function is to allow a user to unify their public cloud storage accounts, enabling them to access all of their digital content from a single user interface. The PINApp enables a user to designate a primary public cloud storage and sharing service (such as STOAMIGO) wherein they will pin/tack digital content that is currently stored on their other public cloud storage and sharing services (such as DROPBOX).

The PINApp enables the digital association of folders, drives and services to take place between one another for the purpose of unifying digital content, resulting in easy access to digital content that is stored on local devices as well as publically available cloud storage and sharing services.

As stated previously in reference to primary functionality, the PINApp can be utilized to digitally associate (or pin/tack) digital content stored on a local device such as a smartphone or tablet, and the digital content stored on a public cloud service such as DROPBOX, to a primary public cloud storage service (as selected by the user) such as STOAMIGO. More specifically, the digital content stored on a user owned device (such as a smartphone or tablet) and the digital content stored on a user managed DROPBOX account can be unified and pinned/tacked to the user managed STOAMIGO account.

Other systems, methods, features and advantages of the PINApp will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
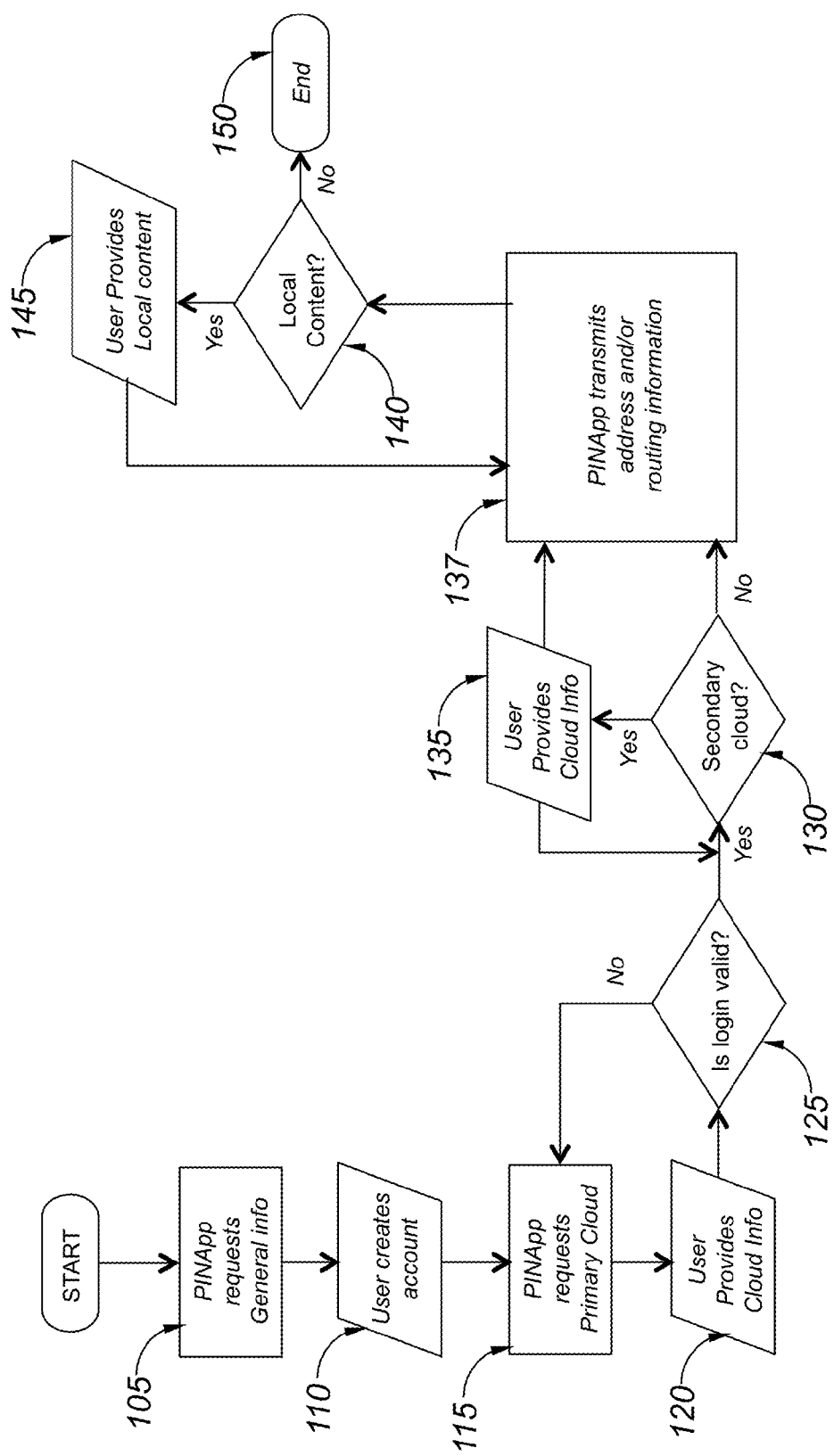
FIG. 1 is a flow diagram, depicting the general flow of the PINApp software functionality.

In the following description, numerous specific details are set forth in order to provide a more thorough description of the present invention. It will be apparent to one skilled in the art that the present invention may be practiced without these specific details. In other instances, well-known features have not been described in detail so as not to obscure the invention.

As previously stated, the PINApp provides two primary functions. The first primary function enables locally stored digital content (such as a folder on a smartphone, laptop or other) to be digitally associated or pinned/tacked to a public cloud storage service (such as DROPBOX or STOAMIGO), allowing the owner of the digital content to access the content through their public cloud storage service user interface (i.e. utilizing the user interface of STOAMIGO to access digital content stored on a smartphone). The second primary function enables digital content stored in a public cloud storage service to be digitally associated or pinned/tacked to another public cloud storage service (i.e. pinning/tacking a folder hosted on DROPBOX to STOAMIGO) enabling the user to unify their digital content stored on public cloud services, selecting a primary public cloud service to access digital content stored on other services (i.e. utilizing STOAMIGO as a primary user interface and cloud service to access digital content stored on DROPBOX). Each of these primary functions will be described in detail in the following paragraphs.

The PINApp enables users of public cloud storage services (e.g. STOAMIGO, Google Drive, DROPBOX, etc.) to digitally assign a folder or drive hosted on a user-owned (local) device to the public cloud storage service. The digital assignment is facilitated utilizing the publicly provided Application Program Interface (API) to allow the cloud storage service to see the content hosted on the user-owned device. The digital content on the user-owned device will be visible and accessible through the public cloud storage service, and can be shared with one or more recipients utilizing the tools existing within the public cloud storage service.

In one preferred embodiment, a digital content owner may have a USB drive that contains digital content that needs to be shared with one or more recipients. Typically, the digital content owner would be required to upload the contents of the USB drive to the public cloud storage service in order to share the content with one or more recipients. The PINApp negates the need for the upload step by enabling the public cloud storage service to see the digital content stored on the USB drive on the digital content owner's host device (such as a laptop).

In the above embodiment, the PINApp allows the USB drive to function as a NAS device by enabling the USB drive to connect directly to the subject public cloud storage service provider. Once the digital content that exists on the USB drive is visible to the public cloud storage service provider, it can be shared and accessed remotely utilizing the public cloud storage service provider tool set and user interface.

The PINApp is a software platform that employs a set of functional modules and algorithms to enable a local user device such as a smartphone, tablet, laptop or other computing device to engage with an existing cloud service, allowing storage and sharing of the digital content hosted on the local user device through the cloud service, negating the need for the digital content to be uploaded to the cloud.

Pinned/tacked digital content (such as a file, folder, drive or other storage component) can be accessed and managed through the user interface of the host service the digital content is being pinned/tacked to. As an example, if a folder hosted on a smartphone or tablet is pinned to a public cloud storage service (like StoAmigo), the user can access the pinned/tacked digital content by accessing their public cloud storage service. As the public cloud storage service user interface is accessed, the digital content that was pinned/tacked to the public cloud storage service will be visible. Specifically, the pinned/tacked digital content will appear as a folder in the directory listing shown in the user interface of the public cloud storage service.

The user can access the pinned/tacked digital content directly through the user interface of the public cloud storage service the digital content has been pinned/tacked to, enabling the user to share, rename, move, copy and execute other commands that are available through the public cloud storage service the digital content has been pinned/tacked to.

The directory structure of pinned/tacked content will remain the same as in the original host location of the digital content, much in the same manner one would experience when copying a folder from one local device (such as a USB hard drive) to a personal computer. The copied folder (from the USB hard drive) would be a subdirectory of the host device (in this case, the personal computer). It's important to note that while reviewing the following figures, the directory structure shown in the examples can be changed at any time by the user incorporating the PINApp. The directory structure given in the examples is for explanation purposes only, to provide clarity and ease of explanation.

The PINApp utilizes existing public cloud services (such as STOAMIGO, DROPBOX, SUGARSYNC, etc.) to enable users to unify their digital content among their devices and services to ease storage and sharing mechanics of digital content stored across multiple devices and platforms. The PINApp utilizes the public API to provide detailed information pertaining to digital content being unified to allow the management of digital content stored across multiple platforms and devices to be accessible through a public cloud service.

It's important to note that the PINApp does not move digital content between devices and public cloud storage platforms. The PINApp provides addressing information to enable all of a user(s) digital content to appear to be stored in the same location, even though it may be spread out across multiple devices and/or multiple cloud storage platforms.

The following discussion will illustrate the basic command flow of the PINApp, relating to the unification of digital content. The following discussion assumes the PINApp software has been installed on a user device (such as a smartphone, laptop computer or other computing device) capable of accessing the user(s) public cloud storage and sharing service.

FIG. 1 illustrates the flow diagram of the PINApp. The initial actuation of the PINApp will prompt the user to enter data at a step 105 pertaining to username, password and other identifiers to ensure the privacy and authentication of the user engaging the PINApp. The user will respond by creating a user account at a step 110 containing their username and password information, along with other identifiers to ensure privacy.

Once the user has created an account at step 110, they will be prompted by the PINApp to select a primary public cloud service at a step 115. This cloud storage service, designated as primary, will be utilized by the PINApp as the host for all subsequent digital content to be pinned/tacked or otherwise digitally associated and unified. The primary public cloud service can be changed at any time in the settings menu within the PINApp. The query for primary and secondary cloud services will only take place upon the initial installation and actuation of the PINApp. All subsequent instances will assume the choices previously entered by the user. Once the host primary cloud storage service has been designated, all pinned/tacked digital content will be accessible and available through the host cloud storage service(s) user interface. It's important to note that the PINApp does not need to be present on the device accessing the public cloud storage service, but it must be running on one of the user devices that are associated with the pinned/tacked digital content. As an example, a user may wish to install and execute the PINApp on a device that is constantly on (such as a smartphone) to ensure the digital content associated through the PINApp remains available at all times. Should an instance occur wherein the device running the PINApp is disabled, the digital content that has been unified through, or otherwise pinned/tacked utilizing the PINApp will be unavailable.

The user will now input their primary public cloud storage service info at a step 120, including the access information (e.g., a username and password) to allow PINApp to engage the public cloud storage service to unify the users local storage devices and other public cloud services. Once the user has entered the primary public cloud storage service info at step 120, PINApp will verify the information is valid at a step 125 by establishing a connection with the primary public cloud storage service. If the information provided by the user at step 120 is not valid as determined at step 125, the PINApp will again request the user enter their primary public cloud storage information at step 115. Once the public cloud storage information entered at step 120 is validated at step 125, the PINApp will query the user for any secondary cloud storage information at a step 130. The secondary cloud storage information queried at step 130 would include any public cloud storage service that the user is currently storing digital content on, that they wish to access through their primary cloud storage service entered in step 120. The secondary cloud storage service will serve as a repository for storage only, while the primary cloud storage service (selected in step 120) will serve as the user interface and access point for all digital content unified using the PINApp.

If the user has entered any secondary cloud storage services at step 130 they wish to engage using the PINApp, that information will be entered at a step 135. The PINApp will query the user about other secondary cloud storage services at step 130 until the process of entering them at step 135 has been completed. Once complete, the PINApp will begin querying the user for local content at a step 140 to be pinned/tacked. The local content can be any folder, device or drive that the user wishes to access from their primary cloud storage service (entered in at step 120). It's important to note that the PINApp will not upload or otherwise copy any of the digital content from any device or any cloud storage to the other. The PINApp will provide addressing and access information at a step 137 to the primary public cloud storage service to enable the user to access all of their digital content from the primary public cloud storage service, utilizing any of their devices capable of engaging the service. The user can enter at a step 145 their local content to be pinned/tacked to the primary cloud storage service (selected in step 120) at this point. The PINApp will query the user for additional local content at step 140 to be pinned/tacked until the user has completed entering the information. Once the user has entered all of their local content at step 145, the setup is complete at a step 150.

Now that the user has pinned/tacked their digital content to a single host location (the primary public cloud storage service), all of their pinned/tacked digital content can be accessed from any of their smart-type devices by logging into their primary public cloud storage service. Each pinned/tacked entity (such as a folder hosted on a PC, or another public cloud service folder) will be listed within the primary directory listing shown on the user interface of the primary public cloud storage service. The user can choose to un-pin/un-tack their content as well as change their pinned/tacked folders at any time. By enabling a user to pin/tack or un-pin/un-tack digital content at any time, the user can easily make digital content available for sharing without the inherent risk associated with uploading and storing the digital content on the public cloud.

Figure 2:
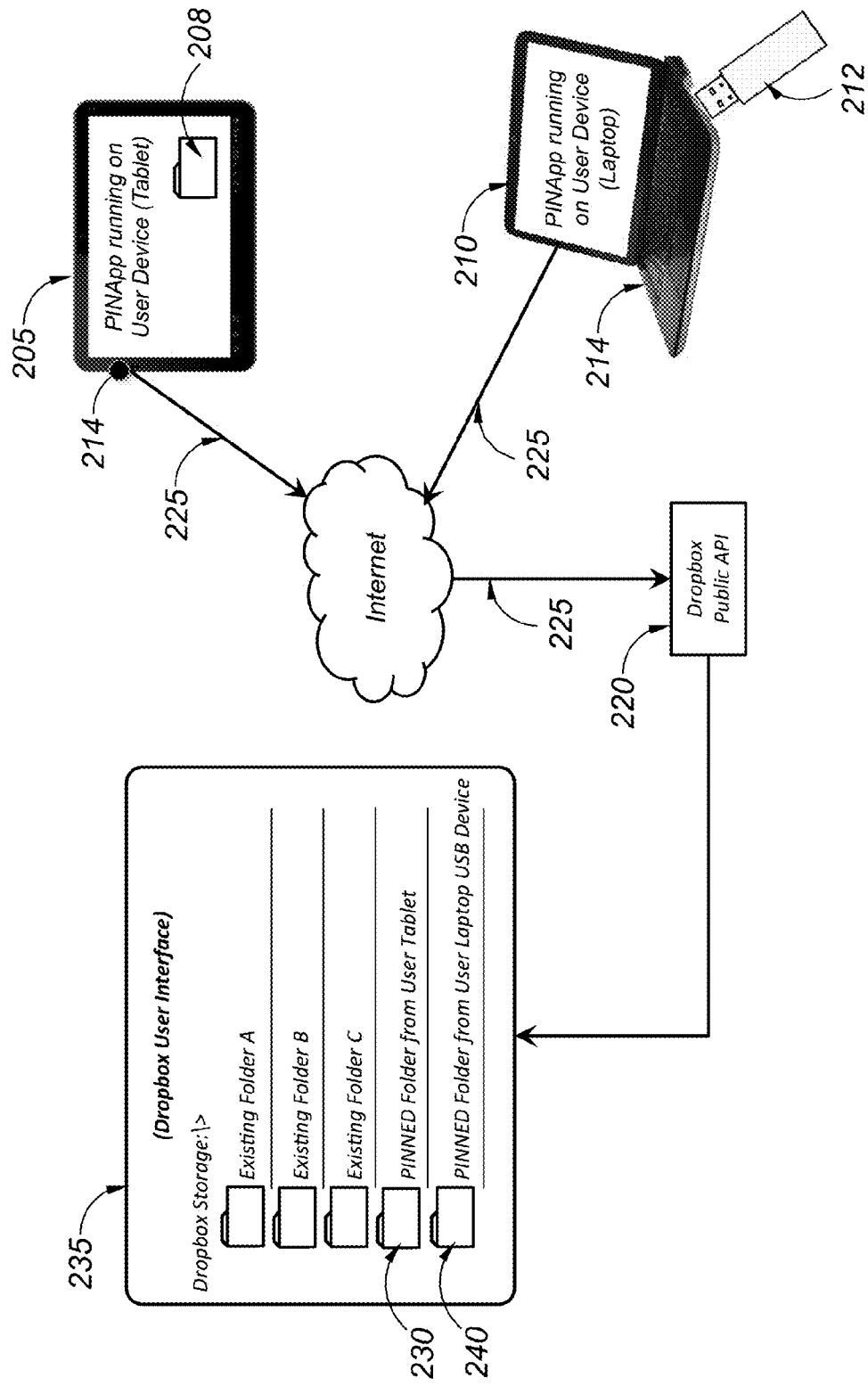
FIG. 2 is a functional application drawing, detailing a primary functionality of the PINApp.

FIG. 2 discusses the physical architecture of the "pinning" or "tacking" function, and the process in which a local folder on a user device can be digitally associated with a public cloud service. To ease the understanding of the following discussion, we will use DROPBOX as the public cloud service provider, and we will explain examples wherein digital storage repositories such as folders and USB drives may be pinned/tacked to the public cloud service (DROPBOX) to allow the sharing of digital content that is not stored on the cloud (i.e. online servers). It's important to note that while the following example uses DROPBOX as the public cloud service provider, the PINApp is designed to interact with any cloud service provider that utilizes a publically available API (Application Program Interface) to allow third party applications to be utilized to manage or enhance the cloud storage service. The functional application aspects of the PINApp will now be discussed with reference to FIG. 2. It's important to note that the PINApp is operating system agnostic, so the user devices discussed in FIG. 2 (tablet 205 and laptop 210) can be utilizing any commonly known operating system to connect to the Internet and perform their basic functional and operational command sets.

As can be seen in FIG. 2, the PINApp has been installed and is running on a user device 205 such as a tablet. The owner of the tablet is using a public cloud service, in this case, DROPBOX. The owner of the tablet 205 wishes to pin/tack a folder 208 that is located on the tablet 205 to their DROPBOX account for the purpose of sharing the digital content of the folder 208 with one or more recipients. Once the PINApp is launched on the tablet 205, the tablet owner can use their existing DROPBOX login and account info to access their DROPBOX account. Once the account access has been established, the tablet owner will select the folder 208 to pin/tack to their DROPBOX account. The PINApp will access the DROPBOX Public API 220 through an Internet connection 225 to provide the physical address information for the folder 208 being pinned from the owner's tablet 205. The information shared with the DROPBOX Public API 220 will enable DROPBOX (the cloud storage provider) to add the folder 208 containing the digital content from the tablet 205 to their user interface 235, allowing the folder 230 to appear in the user interface 235. The digital content contained in the folder 208 on the tablet 205, represented in the user interface 235 by reference 230 can now be managed and shared, just as if it were to actually exist on the DROPBOX web server. The digital content stored in the folder 208 never actually leaves the tablet 205, but rather is accessible for sharing through a system of addresses provided through the PINApp software and algorithm.

In a similar fashion as detailed above, the user may wish to pin/tack digital content that is hosted on a USB device 212 connected to a laptop computer 210 that is running the PINApp software. As the owner of the laptop 210 establishes a connection with their DROPBOX service through the Internet connection 225 via a network interface 214 or other communication device, the PINApp software connects with the DROPBOX Public API 220 to provide addressing and routing information, providing the DROPBOX server with the necessary data to allow the digital content hosted on the USB device 212 to be displayed in the DROPBOX user interface 235 as shown in reference 240. Here again, the contents of the USB device 212 never leave the USB device 212, but rather are made accessible for sharing through the PINApp software and algorithm.

It's important to note that if either device (the tablet 205 or the laptop 210 running the USB device 212) is off-line, the folders 230 and 240 displayed in the DROPBOX user interface 235 will still be shown in the DROPBOX user interface 235, but will be inaccessible, and remain inaccessible until such a time as the devices (tablet 205 and laptop 210 with the USB device 212) are brought back online. Likewise, if the USB device 212 is disconnected from the laptop 210, the folder 240 on the DROPBOX user interface 235 will still be listed, but the digital content contained in the USB device 212 will be unavailable.

The PINApp utilizes a command set that communicates with the public API of the subject cloud storage service to allow the digital content stored and controlled by the user(s) local device (e.g. laptop or smartphone) to be accessible through the cloud storage service.

As previously stated, the PINApp is a software application that can be installed on one or more devices such as smartphones, tablets, personal computers and other computing and/or smart-type devices, and interface with a cloud storage provider to share digital content stored on one or more of these personal computing devices. The system level components of the PINApp control the method in which the user device interacts with the cloud storage service(s) to ensure the privacy and security of the digital content residing on the device remains intact. Specifically, the digital content stored on the device being connected to the cloud service through the PINApp is not uploaded to the cloud server. The digital content can remain safely on the user device and still be shared through the public cloud service. The primary functional and architectural components and modules of the PINApp will now be discussed with reference to FIG. 3. It's important to note that while other aspects of operation and functionality exist within the PINApp system, they have been purposely omitted to provide focus and clarity for the primary functional elements.

Figure 3:
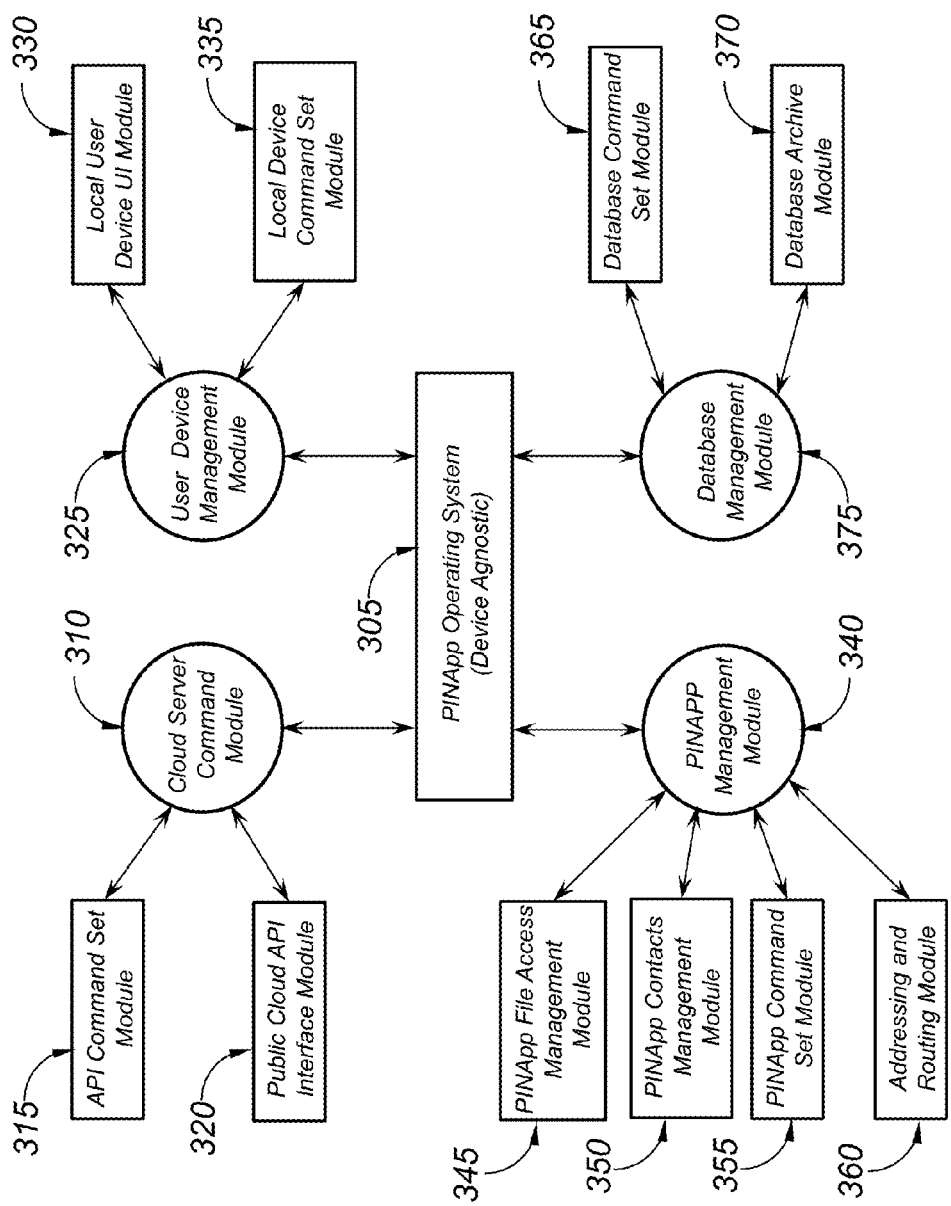
FIG. 3 is a block diagram detailing the functional modules and key components of the PINApp.

As can be seen in FIG. 3, the PINApp comprises of a series of software modules that work in conjunction to provide the infrastructure required to facilitate operation. The center of the PINApp is the device agnostic Operating System 305. The Operating System 305 governs the overall operation of the PINApp to ensure balance and synergy between respective modules. All functional aspects are managed and routed by the device agnostic operating system 305 of the PINApp. Each functional module (detailed below) communicates and performs primary functionality through the PINApp operating system 305.

The PINApp operating system 305 has four primary modules that work in conjunction with each other and the PINApp operating system 305 to connect the user device where the PINApp is installed with the cloud service provider(s). These four primary modules are the cloud server command module 310, the user device management module 325, the PINApp management module 340, and the database management module 375. The following paragraphs will detail the function of each.

The cloud server command module 310 is primarily responsible for managing and routing information and communication that enter and leave the PINApp from the external cloud service provider. The cloud server command module 310 employs the API command set module 315 and the public cloud API interface module 320 to manage commands as they are sent to, and received from, the external cloud service provider. The API command set module 315 permits the execution of commands such as copy, share, move files, etc. The public cloud API interface module 320 manages the connection between the PINApp operating system 305, the internal functional and operational commands and communication within the PINApp and the interface to the public cloud storage server(s).

The user device management module 325 is responsible for managing the communications and command sets that govern the installation and functional operations that take place on the user device (such as a smartphone, tablet, laptop, etc.). The user device management module 325 incorporates the local user device UI module 330 that controls command sets running on the local device. The local user device UI module 330 allows the input of commands from the user of the local device to be entered into the PINApp. These commands are subsequently routed through the user device management module 325 into the PINApp operating system 305 for distribution to the associated modules. The local device command set module 335 is responsible for interpreting the commands being entered into the local user device UI module 330. Since the PINApp is device agnostic, the local device command set module 335 will interpret commands from Android, iOS, Windows, Linux, MAC and other commonly known operating systems. These commands are translated through the user device management module 325 for routing and management through the PINApp operating system 305.

Continuing to refer to FIG. 3, the PINApp management module 340 controls the primary operational functionality of the PINApp. The primary functions to be discussed are the PINApp file access management module 345, the PINApp contacts management module 350, the PINApp command set module 355 and the addressing and routing module 360. All functional operations performed through the PINApp are managed through the PINApp management module 340. As with all other primary functional modules, the PINApp management module 340 communicates directly through the PINApp operating system 305.

The PINApp file access management module 345 is responsible for controlling access and commands associated with the files and folders managed within the PINApp. This module interprets the commands entering the PINApp management module 340 from other areas of the PINApp. As an example, if a command were to come into the PINApp from an external cloud service API (via the public cloud API interface module 320) the command would be routed from the cloud server command module 310, through the PINApp operating system 305 into the PINApp management module 340. At this point, the command would reach the PINApp file access management module 345 for acknowledgement and processing within the PINApp system. The PINApp file access management module 345 contains important permission and access information about the files and folders managed within the PINApp.

The PINApp contacts management module 350 allows the PINApp to work in conjunction with the cloud service provider contact management to govern access to the files and folders managed within the PINApp. Only person(s) who have been granted permission to the digital content managed through the PINApp will appear in the PINApp contacts management module 350. This ensures the PINApp can protect and restrict access to the digital content. The recipient of shared digital content (as an example) would be listed in both the PINApp contacts management module 350 and the external cloud service contact database to ensure the proper recipient is granted access to the digital content, while others are restricted.

The PINApp command set module 355 processes all the actions that take place outside of the PINApp. Specifically, if a command for a file or folder enters the PINApp from a cloud service provider, that command is managed by the PINApp command set module 355. As an example, if a user of the PINApp pins/tacks a folder to a public cloud service, that folder can be accessed from the public cloud server user interface. As a command from the public cloud server user interface (such as a view command) enters the PINApp, it will appear at the public cloud API interface module 320 and be interpreted based on the API command set module 315. That command is then routed through the cloud server command module 310 into the PINApp operating system 305. The operating system will route the command to the PINApp management module 340, which in turn will route the command to the PINApp command set module 355. The PINApp command set module will interpret the command coming in from the public cloud server user interface as a "view" command, then provide the addressing and routing module 360 (discussed below) with the appropriate information to allow the addressing and routing module 360 to interface with the database management module 375 (discussed below) to access the associated file for viewing. The PINApp command set module 355 also provides information pertaining to permissions and access rights, based on the information received from the PINApp file access management module 345.

As referenced above, the addressing and routing module 360 processes information that pertains to the folder that has been pinned/tacked to the public cloud storage server. Functional aspects of file and folder management such as adding and removing files from a folder, or folders from the system are managed through the addressing and routing module 360.

The final subsystem module contained within the PINApp is the database management module 375. The database management module 375 provides all of the location data for each file, folder, drive and system being managed by the PINApp. The database management module 375 engages the operating system 305 to allow the subset commands to engage the files and folders managed within the system. The database command set module 365 is responsible for tracking and communicating information related to the digital content such as basic access rights, permissions and other digital content related parameters. The database archive module 370 contains all of the database information pertaining to where the digital content is stored. Content stored in the PINApp on the local user device, as well as content stored on external cloud storage servers is managed through the database archive module 370. Any commands, actions or management functions that occur to any file, folder, drive or other system being managed by the PINApp will be stored in the database archive module 370, as well as the addressing information for the external digital content managed through the PINApp.

The above referenced functional modules of the PINApp work in conjunction with the local user device and the external cloud storage service to enable a user to digitally "pin" or "tack" a folder, drive or system to a public cloud service.

The PINApp may be executed on one or more processors of various computing or other devices, such as the laptop or tablet devices discussed above. Communications with other devices, such as data storage services and other user devices will typically occur through one or more communication devices, such as wired or wireless network or other communication interfaces capable of communicating via one or more communication protocols.

As discussed with reference to FIG. 3 above, the PINApp employs a modular approach to manage functions needed to support the pinning/tacking (or digital association) of content stored across multiple devices and multiple platforms for the purpose of unifying digital content. The following FIG. 4 will provide a functional discussion as to the implementation of these modules in an application wherein digital content stored on a personal device (such as a smartphone, tablet, hard drive or USB drive) is pinned/tacked to a public cloud storage service.

Figure 4:
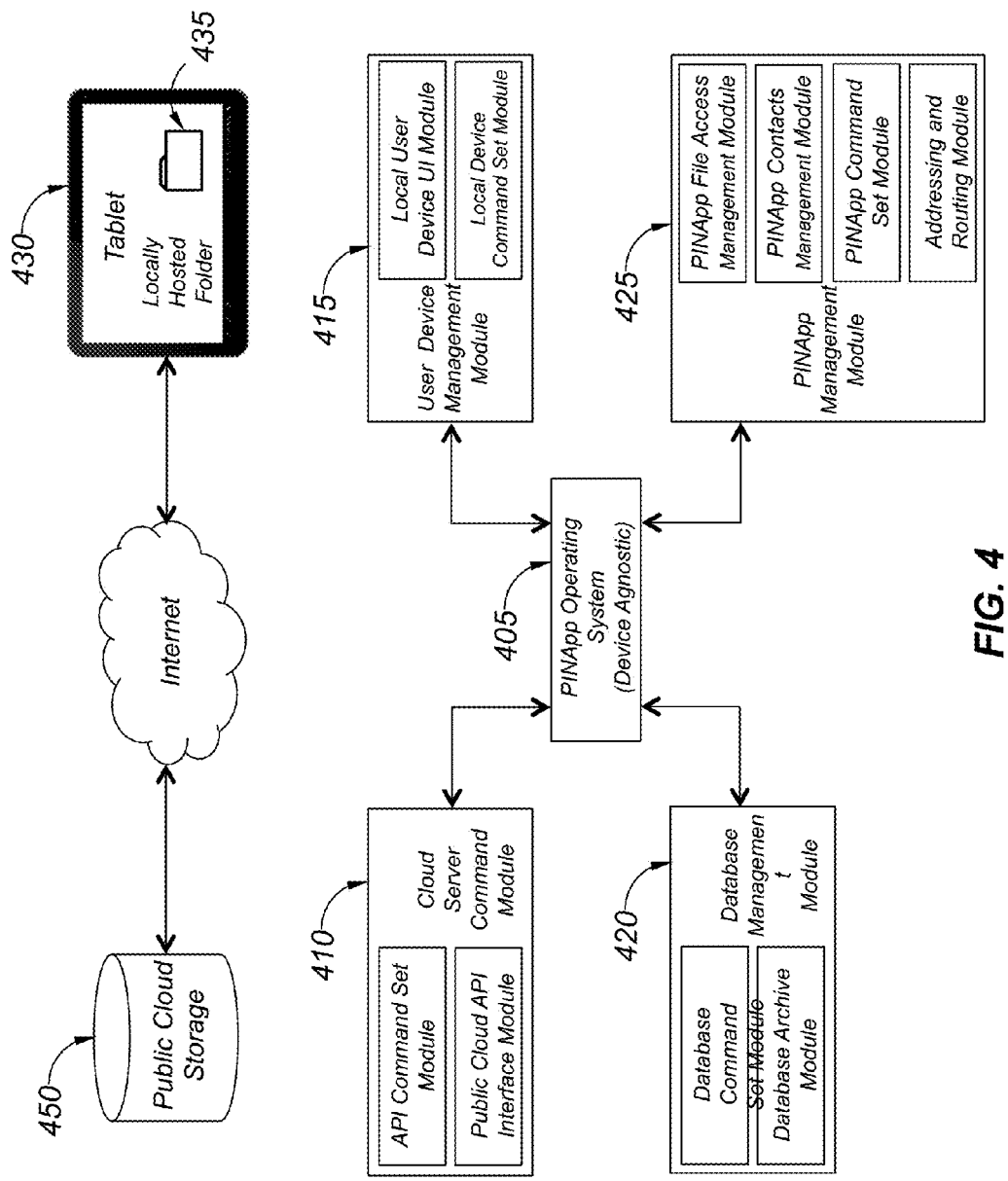
FIG. 4 is a block diagram detailing the interaction of the functional modules of the PINApp.

FIG. 4 is a representation of the interaction of the functional modules of the PINApp. As stated previously, the PINApp utilizes a modular approach (cloud server command module 410, user device management module 415, database management module 420 and PINApp management module 425) to management of all functions to ensure primary functional requirements are met. Each module performs a specific function, and interacts with the PINApp's device agnostic operating system 405 to perform the function of unifying digital content stored across multiple devices and platforms.

The following discussion in FIG. 4 referencing the interaction of the functional modules of the PINApp assumes the PINApp has been installed on the tablet 430 pictured in FIG. 4. Additionally, the following discussion in reference to FIG. 4 assumes the PINApp has been configured with the user's personal information and their cloud storage service choices have been made. These configuration settings are discussed previously in this submission with reference to FIG. 1.

Referring to FIG. 4, a file folder 435 is hosted on a tablet 430 device that is owned by a typical user (not pictured). The user wishes to pin/tack the file folder 435 to the public cloud storage 450 service. As previously stated, pinning/tacking digital content (such as file folder 435) to the public cloud storage service (such as reference 450) enables the user to share the file folder 435 and its contents with other users (such as friends, family, coworkers or other) while negating the need to upload the digital content (file folder 435) to the public cloud storage service (450). Pinning/tacking the file folder 435 to the public cloud storage service 450 will also enable the owner of the tablet 430 to access the file folder 435 from other devices (such as smart phones, laptops, PC's and other computing devices) capable of communicating with public cloud storage service 450.

The pinning/tacking process happens through the PINApp wherein the user of tablet 430 accesses the local PINApp menu (not pictured), to begin the pinning/tacking operation. The user will provide detailed information to the PINApp such as the digital content to be pinned/tacking (in this case, file folder 435) and the location in which to pin/tacking the digital content (in this case, public cloud storage 450). The PINApp will provide the associated addressing and routing information required to access each. The command sequence will enter PINAPP through the user device management module 415. This module controls the local user device user interface as well as the command set available to the user of the local device. In this example, the user device management module 415 is providing command sets and user interface functionality that is compatible with the tablet 430 hosting the digital content to be pinned/tacked.

The command sequence will be routed through the PINApp device agnostic operating system 405. As the command sequence is interpreted, the operating system 405 will communicate directly with the cloud server command module 410 to ensure that a connection exists between the PINApp and the public cloud storage 450 service. Once that determination is made, the PINApp will notify the database management module 420, indicating that digital content (file folder 435) will be pinned/tacked (digitally associated) with public cloud storage 450. The database management module 420 will store the information and communicate to the PINApp management module 425, requesting addressing and routing information for the digital content to be pinned/tacked (in this case, file folder 435). The PINApp management module 425 will return the routing and addressing information to the database management module 420 where it will be stored. This information will also be routed through the PINApp operating system 405, through the cloud server command module 410 to the public cloud storage service 450. The addressing and routing information provided to the public cloud storage 450 service will enable the service to list the contents of the file folder 435, as if it was being stored in the public cloud storage service 450, even though it remains hosted on the tablet 430.

At this point, if the user were to log into the public cloud storage 450 service, the directory listing would show the file folder 435 and the associated digital content hosted in the folder.

The file folder 435 hosted on the tablet 430 is now digitally associated (or pinned/tacked) to the public cloud storage service 450. The user may now engage in sharing the file folder 435 with others such as friends, family, coworkers, etc. The sharing and file management functions are all controlled by the public cloud storage service 450, and governed by the functional feature set available through the public cloud storage service 450. The attributes assigned to the file folder 435 by the public cloud storage service 450 will be stored in the PINApp management module 425. As an example, now that the digital content (file folder 435) has been pinned/tacked to the public cloud storage service 450, the user (owner of the tablet 430) decides they want to share the file folder 435 with a friend.

The owner of the tablet 430 can access their public cloud storage service 450 outside of the PINApp and see their file folder 435 listed in the directory listing of the public cloud storage service 450 user interface. The owner can execute a command through the public cloud storage service 450 to share the file folder 435, just as they would if the folder 435 is hosted on the public cloud storage 450. Once the sharing command is executed, the PINApp will recognize the addressing information coming into the device through the cloud server command module 410. The PINApp will determine that the public cloud storage service 450 is sharing the file folder 435 and will engage the PINAPP management module 425 and the database management module 420. The PINApp management module 425 will provide addressing and routing information to the public cloud storage service 450, enabling the sharing to take place. The PINApp management module 425 will also record information provided by the public cloud storage service 450 such as contacts the file folder 435 has been shared with, and the associated access permissions. This information will be provided by the PINApp management module 425 to the database management module 420 for archive purposes. Any changes made to the access rights, sharing permissions, location of the digital content (file folder 435) or other instances that effect the shared file folder 435 will be recorded within the database management module 420.

Figure 5:
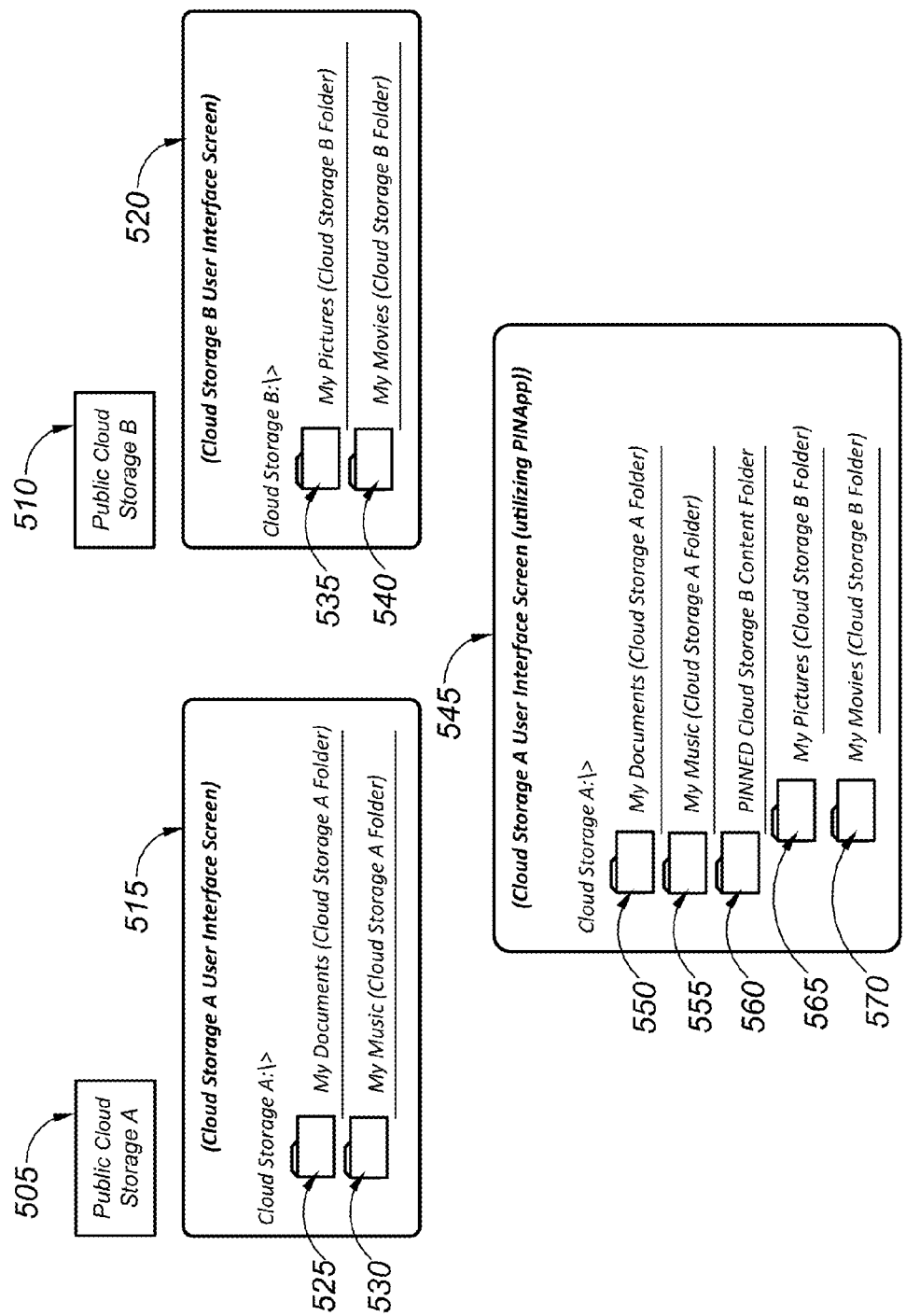
FIG. 5 is a representation of the User Interface screens merged utilizing the PINApp.

As discussed, the PINApp allows a user to digitally "pin" or "tack" a locally hosted folder, file or drive to a public cloud storage service for the purpose of enabling them to share digital content stored on their local user device through the cloud, negating the need to upload or otherwise copy the digital content to a public cloud server. In addition to the above referenced functionality, the PINApp provides a method wherein the contents of a public cloud storage service (such as DROPBOX) can be digitally "pinned" or "tacked" to another public cloud storage service (such as STOAMIGO). The digital content stored in the first public cloud service (such as DROPBOX) will be represented by a folder in the second service (such as STOAMIGO). Utilizing the above example, a user would be able to access their STOAMIGO public cloud storage account and see all of the digital content stored on their DROPBOX public cloud storage account as well. The digital content contained within the DROPBOX account would be represented within the STOAMIGO user interface screen as a folder, existing as a moveable subdirectory of the main STOAMIGO System folder. As an example, when a user accesses their STOAMIGO public cloud storage account, they would see a folder entitled "Dropbox". The DROPBOX folder (when accessed) would contain all of the digital content held within the DROPBOX public cloud folder. The existing DROPBOX directory and subdirectory names and structures would be used, and housed within the main DROPBOX folder, existing as a subdirectory within the STOAMIGO user interface. FIG. 5 below illustrates how the digital content would be represented within the PINApp, wherein one public cloud storage service is digitally "pinned" or "tacked" to another public cloud storage service.

Referring to FIG. 5, we have public cloud storage A 505 and public cloud storage B 510. A user (not pictured) utilizing the PINApp wishes to digitally associate or otherwise "pin" or "tack" the contents of public cloud storage B 510 to public cloud storage A 505. This will enable the user (not pictured) to access all of their digital content from the user interface of public cloud storage A 505, negating the need for the user to switch between the two public cloud storage services to manage digital content.

As shown in FIG. 5, public cloud storage A has a user interface screen 515 that shows two folders currently being stored on public cloud storage A 505. These folders are My Documents 525 and My Music 530. The user also has a secondary public cloud server account, represented as public cloud storage B 510. Hosted on public cloud storage B 510, the user has two folders as shown in the public cloud storage B user interface screen 520. These folders are My Pictures 535 and My Movies 540. By utilizing the PINApp to digitally associate the content hosted on public cloud storage B 510 with that of public cloud storage A 505, all of the digital content stored on these public cloud storage services (A 505 and B 510) would be combined in a single user interface screen as represented in FIG. 5, 545. The updated cloud storage A user interface screen 545 shows the digital contents that exist on public cloud storage A 505 as represented by cloud storage A user interface screen 515, and the digital contents that exist on public cloud storage B 510 as represented by cloud storage B user interface screen 520. The updated cloud storage A user interface screen 545 contains (from public cloud storage A 505) My Documents 550 and My Music 555, as well as a newly created folder PINNED Cloud Storage B Content Folder 560. This folder, created by the PINApp allows the digital content stored on public cloud storage B 510 to be shown within the cloud storage A user interface screen 545. The folder names My Pictures 565 and My Movies 570 remain unchanged, and are listed exactly as represented by cloud storage B user interface screen 520.

While the digital content hosted on the servers (public cloud storage A 505 and public cloud storage B 510) does not physically move or otherwise get copied or downloaded, the file and folder names and locations will appear in the combined user interface screen (cloud storage A user interface screen 545) to enable the user to access their digital content from both of the public cloud storage systems (A 505 or B 510) without physically changing the user interface or switching between the systems.

The PINApp (as explained above) allows the contents of one or more public cloud storage services to be listed as a folder and/or subdirectory within another. Once a connection between the two public cloud storage services is established through the PINApp, the user can easily log into their "primary" public cloud storage service (in this case public cloud storage A 505) and see the digital contents of public cloud storage B 510 as they have been digitally pinned/tacked. It's important to note that the storage space in public cloud storage A 505 is not being utilized to store the digital contents currently hosted on public storage B 510, but rather the directory and subdirectory listings are being shared. The process as illustrated in FIG. 5 and the above description can be repeated, allowing a user to utilize the PINApp to digitally pin multiple cloud storage services to a single service, thus eliminating the need to switch between services for the purpose of managing their digital content.

As previously discussed, one preferred embodiment of the PINApp allows a user to pin/tack a folder hosted on a local device to a public cloud service for the purpose of sharing the digital content contained in the folder without the need to upload it to the public cloud. Further, the PINApp negates the need for a dedicated device referred to in public retail sectors as PCD's, "Personal Clouds", "Private Clouds" and NAS devices. By eliminating the need for the dedicated device as described, and the need for the digital content to be uploaded or otherwise copied to the public cloud, a user can safely share their digital content with friends and family, without ever having the content leave their device, and minimizing the cost to do so. The functional aspects of pinning/tacking locally stored digital content to a public cloud service will now be discussed with reference to FIG. 6. While FIG. 2 discussed primarily a folder hosted on a device, FIG. 6 will focus on pinning/tacking an entire device to a public cloud service.

Figure 6:
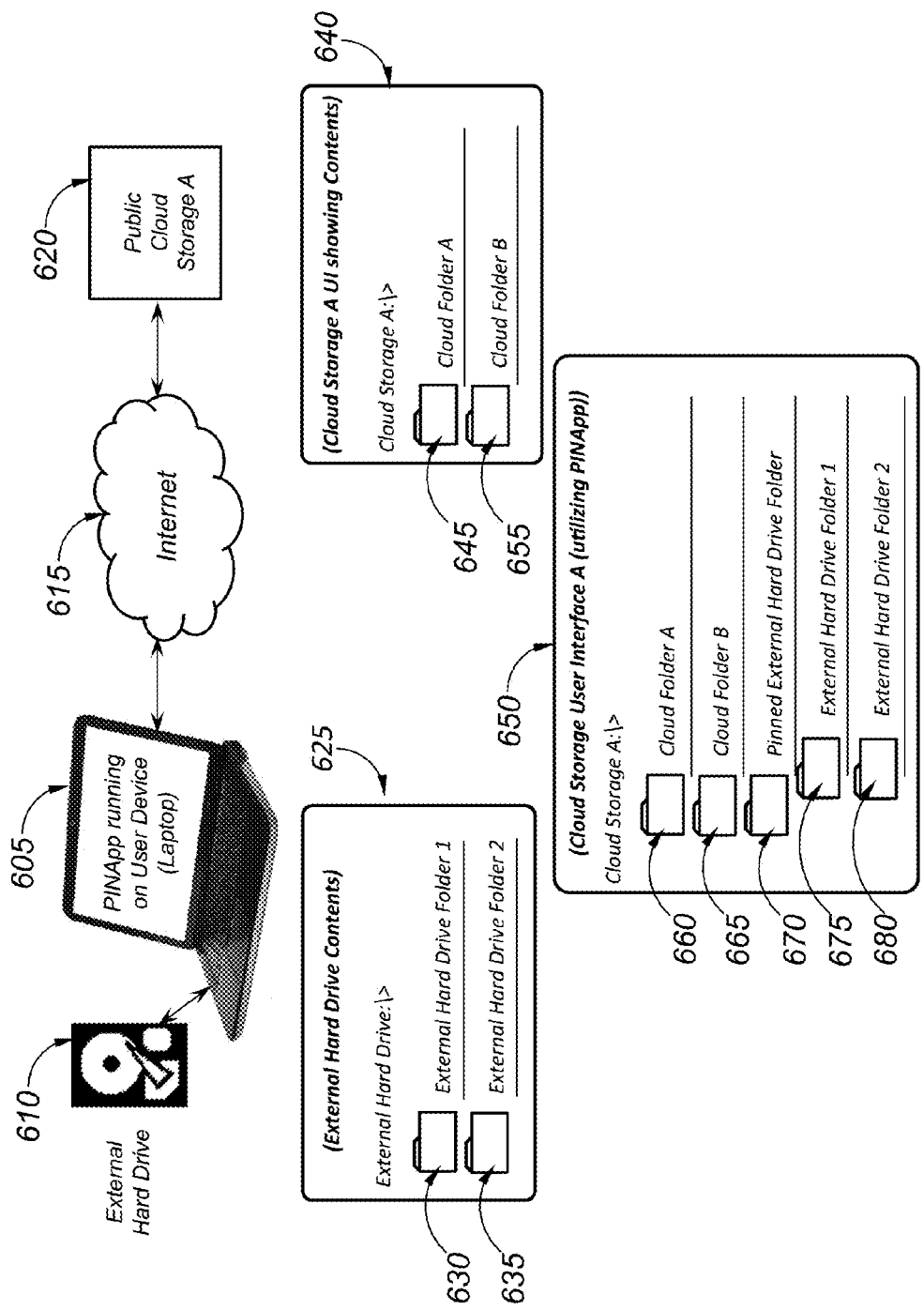
FIG. 6 is a block diagram detailing how the PINApp digitally associate (pin/tack) an external hard drive to a public cloud storage service.

As can be seen in FIG. 6, a laptop computer 605 with an external hard drive 610 is connected to the Internet 615. The process of pinning/tacking the external hard drive 610 to the public cloud storage A 620 begins by the user launching the PINApp on the user device, in this case, a laptop computer 605. Once the PINApp is running, the user will log into the public cloud storage A 620 by entering the appropriate login credentials.

Once the connection from the laptop 605 to the public cloud storage A 620 is established the user can utilize the PINApp running on the laptop 605 to digitally associate, or "pin" the external hard drive 610 to the public cloud. The pinning/tacking process takes place within the PINApp, wherein the software shares addressing and location information relative to the digital content (i.e. files and folders) stored on the external hard drive 610. The PINApp presents this information to the public cloud storage A 620 in a format wherein the public cloud storage A 620 can easily identify the folder containing the digital content stored on the external hard drive 610 and can add the folder to the existing folder and file listing containing the digital content currently stored on the public cloud storage A 620.

The addressing and routing information provided by the PINApp running on the laptop 605 to the public cloud storage A 620, relating to the digital content stored on the external hard drive 610 allows the public cloud storage A 620 to list the contents of the external hard drive 610 as if they were actually being stored on the public cloud storage A 620, but are actually stored locally on the external hard drive 610. To illustrate, in one exemplary embodiment, addressing information may comprise an IP or other network address (and or communication port) of a laptop 605 while routing information may comprise a routing table or other data defining a path (such as through one or more firewalls or not) through which communication with the laptop 605 and access to its external hard drive 610 can occur. It is noted that addressing information may be in the form of a URL or URI in some embodiments. Addressing and/or routing information may be determined by probing one or more network connections of the laptop 605, such as with traceroute or other network utility.

While all the names of each file, file sizes and directory and folder structure will appear on the updated public cloud storage user interface A 650, the digital content stored on the external hard drive 610 is never uploaded to the public cloud storage A 620. Further, if the external hard drive 610 is disconnected from the network (e.g. unplugged from the laptop 605) the digital content stored on the external hard drive 610 will no longer be accessible from public cloud storage A 620. The directory structure, file names and other routing information will still be displayed on the public cloud storage user interface 650, but the digital content will not be accessible. In a like fashion, if the laptop 605 running the PINApp is no longer connected to the Internet 615, the digital content stored on the external hard drive 610 will not be accessible from public cloud storage A 620.

To illustrate this aspect of the operation, FIG. 6 shows the digital content that is currently stored on the external hard drive 610 in reference 625. Reference 625 is an illustration of what a directory listing would look like if the user was browsing the external hard drive 610 to access the contents of the drive. The digital content currently stored on the external hard drive 610 is identified as External Hard Drive Folder 1 630 and External Hard Drive Folder 2 635. Under normal circumstances, this digital content would only be visible to the laptop 605 that is connected directly to the external hard drive 610. Utilizing the PINApp, the routing and addressing information of the digital content 625 (External Hard Drive Folder 1 630 and External Hard Drive Folder 2 635) is provided to the public cloud storage A 620 service to allow the user to access the referenced digital content 625 directly through the public cloud storage service A 620, negating the need for the user to carry the external hard drive 610 with them.

Reference 640 is the cloud storage A user interface screen, which displays the digital content currently stored on the public cloud storage A 620. The digital content currently stored on the public cloud storage A 620 is Cloud Folder A 645 and Cloud Folder B 655. Once the PINApp running on the laptop 605 enables the public cloud storage A 620 to see the addressing and routing information for the digital content 625 (External Hard Drive Folder 1 630 and External Hard Drive Folder 2 635) stored on the external hard drive 610, the public cloud storage user interface A 650 will be updated to include both sets of digital content. Specifically, the digital content stored on the external hard drive 610 (External Hard Drive Folder 1 630 and External Hard Drive Folder 2 635) will be displayed in the same public cloud user interface screen A 650 as the digital content currently stored on the public cloud storage A 620 (Cloud Folder A 645 and Cloud Folder B 655).

Upon completion of the pinning/tacking process, the digital content stored in the public cloud storage A 620 and the external hard drive 610 will be visible through the public cloud storage user interface A 650. As can be seen in FIG. 6, reference 650, each folder shown in reference 625 (External Hard Drive Contents) and 640 (Cloud Storage A UI showing contents) are now provided. The user can now remotely access the digital contents of Cloud Folder A 660, Cloud Folder B 665, Pinned External Hard Drive Folder 670, External Hard Drive Folder 1 675 and External Hard Drive Folder 2 680. PINNED External Hard Drive Folder 670 was created by the PINApp during the pinning/tacking process to provide a host location within the directory structure of the public cloud storage A 620 to enable the contents of the external hard drive 610 to be displayed in the public cloud storage user interface A 450. As with all digital content, folders (such as 660, 665, 670, 675 and 680) can be renamed, moved and otherwise managed from the cloud storage user interface A 650, once the PINApp has pinned the digital content to the public cloud storage A 620.

Now that the digital content contained in the external hard drive 610 is digitally pinned/tacked to the public cloud storage A 620, all digital content stored in both of these locations can be accessed from the public cloud storage user interface A 650. Here again, the digital content on the external hard drive 610 is not copied, moved to, or otherwise occupying storage space on the public cloud storage A 620.

The PINApp provides digital routing and addressing information to allow one or more external services, like public cloud storage and sharing services referenced in this example to access digital content stored on a local device (such as the external hard drive 610 in the above example). The routing information that is shared with the public cloud storage facility allows the public cloud storage facility to list the digital content in a readable format (such as showing folder and file names in the user interface), allowing a user to log into their public cloud account and access the digital content stored in a personal device (like the external hard drive 610) from a remote location. Here again, this gives the user remote access to their digital content, negating the need to store it on the public cloud. Further, it also negates the need for the user to purchase online storage subscriptions, or to purchase and deploy expensive "personal cloud storage" or "personal cloud" type devices.

As previously stated, once the digital content stored on the local device is pinned/tacked or otherwise digitally available through a public cloud service, the digital content stored on the local device (in this case, external hard drive 610) can be moved, copied, renamed, downloaded, uploaded, shared, played, viewed and otherwise completely managed through the public cloud service from any remote device (such as a smartphone or tablet) that is compatible with the public cloud service. Again, as long as the PINApp is running on the local device (in this case a laptop 605) and the device containing the digital content (in this case, external hard drive 610) remains connected, the digital content (represented by reference 625) will remain available remotely by accessing the public cloud.

In a similar fashion as the example above, the PINApp can be used to digitally pin/tack local folders and drives to FTP-type (File Transfer Protocol) servers. FTP servers are often used by businesses and other public or private organizations to manage digital content in a domain or system that is completely controlled by the business. The functional connectivity and operation of the PINApp while engaging an FTP-type server is identical to that explained with reference to FIG. 6 above.

As stated previously in this submission, the PINApp can be utilized to digitally associate the contents of one or more cloud storage services with another. Further, the PINApp can be used to manage digital content stored on user owned and managed devices such as hard drives, external USB type drives, smartphones, tablets and other computing devices. The PINApp enables a user to access all of their digital content from a single location, even when it's hosted on multiple devices in a variety of locations. The PINApp negates the need continuously navigate between devices, user interfaces, software platforms and operating systems.

The PINApp is particularly well suited for use in applications wherein a user wishes to create their own environment where all of their digital content can be accessed utilizing any of their computing or smart type devices such as a laptop computer, personal computer, tablet, smartphone and other computing type devices.

The PINApp provides addressing and routing information to interconnected devices and cloud services for the purpose of detailing the location of digital content. As an example, when a folder is pinned/tacked from a local device such as a smartphone to a public cloud storage service, the PINApp provides a connection between the public cloud storage service and the folder being pinned/tacked so that the folder can be accessed through the user interface of the public cloud storage service. Since the PINApp provides routing and addressing information in real time, changes to digital content (such as adding files, renaming folders and the like) are reported to all interconnected devices instantly. Additionally, the PINApp needs to be running on the device that established the connection from the public cloud service to the digital content being pinned/tacked in order to maintain accessibility to the digital content. Once digital content has been pinned/tacked (and the PINApp continues to run) the pinned/tacked digital content will be accessible through the public cloud service it was pinned/tacked to. Ideally, the PINApp could run from a home or office personal computer that unified all of the user's digital content. This would enable the user to access all of their digital content by accessing the public cloud service the digital content was pinned/tacked to.

The PINApp does not need to be running on a device being utilized to access previously pinned/tacked digital content. As an example, if an external hard drive (as explained with reference to FIG. 6) was pinned/tacked to a public cloud storage service using one device, the user could utilize any of their other computing devices to access the public cloud storage service and gain access to the pinned/tacked digital content as long as the PINApp was still running on the device that established the pinned/tacked connection. As previously stated, the PINApp is particularly well suited for use when it can be deployed on an always-on type device. This ensures the digital content being pinned/tacked to the public cloud storage platform(s) is always readily available from any of the computing devices the user could otherwise utilize to access the public cloud storage platform.

Figure 7:
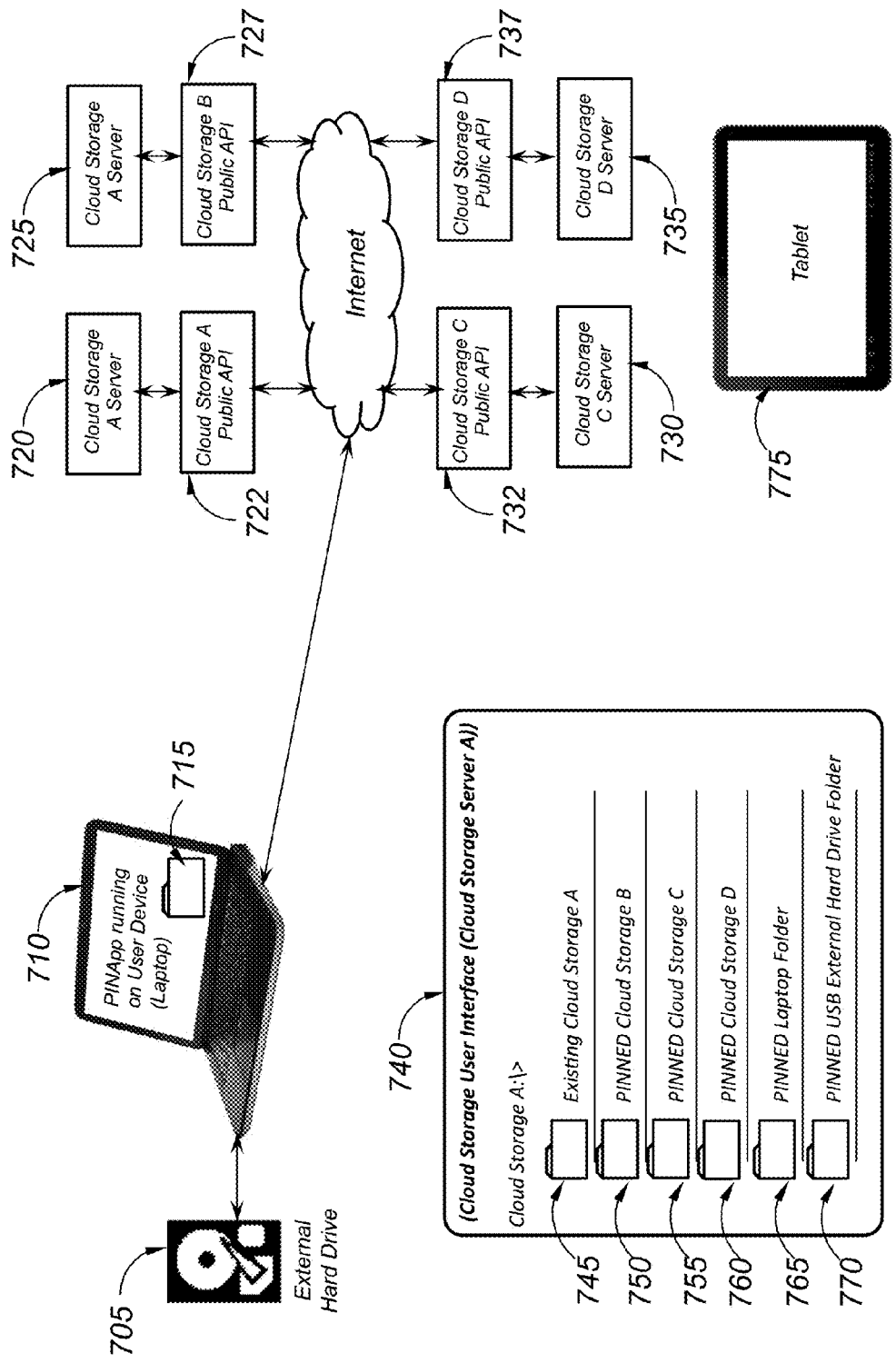
FIG. 7 is a block diagram detailing how one or more public cloud services and devices can be unified utilizing the PINApp.

The example we share in FIG. 7 will illustrate the unification of digital content stored on multiple user-owned devices and on multiple public cloud storage services. It's important to note that when unifying multiple cloud storage services as will be explained in FIG. 7, the user will need to determine which service they wish to utilize as a "primary" or "host" service. This will be the service they log into when accessing their unified digital content.

Referring to FIG. 7, the process of unifying digital content begins by a user initiating the PINApp on their computing device, in this case, a laptop computer 710. Once the PINApp is running on the laptop computer, the user must log into each of their public cloud storage accounts. It's important to note that this process only needs to happen on the initial unification or "pinning" or "tacking" process.

The login process takes place subsequent to the launch of the PINApp to ensure that the PINApp can establish communications with each of the cloud storage servers (cloud storage server A 720, B 725, C 730 and D 735). The PINApp will record the login information as it is entered by the user via laptop 710. Once the PINApp has the login information for each service and/or connected device, the PINApp will automatically establish and maintain connections, eliminating the need for the user to log into each service going forward.

Now that the PINApp has been launched on the local device (the laptop 710) and the user has logged into each of their respective public cloud storage accounts (cloud storage A 720, B 725, C 730 and D 735), the user can begin the process of unifying their digital content. To simplify explanation of the unification process, we will focus individually on each entity to be unified through the PINApp.

Since the user will be establishing a "primary" or "host" cloud service to allow them to share and remotely access their respective digital content being pinned/tacked through the PINApp, the user has chosen to make cloud storage server A 720 their default/primary public cloud. The PINApp will utilize cloud storage server A 720 as the default, and all digital content pinned/tacked through the PINApp will be assigned (pinned/tacked) to cloud storage server A 720.

The PINApp will now begin providing addressing, routing, file location, file permission, file type and other specifics about the digital content being pinned/tacked to cloud storage server A 720 through the cloud storage A public API 722. The information provided by the PINApp to the cloud storage A public API 722 will enable cloud storage server A 720 to include the digital content information as part of the directory structure illustrated by the cloud storage user interface 740. Each time digital content is pinned/tacked to the cloud storage server A 720, the information provided by the PINApp (hosted on the laptop 710) will be utilized to enable the cloud storage server A 720 to instantly identify digital content, location information, name and type of digital content, and other associated identifying characteristics of the digital content being pinned/tacked. Again, this information is used by cloud storage server A 720 to enable the user to access pinned/tacked digital content through the user interface of cloud storage server A 720, represented by reference 740 Cloud Storage User Interface.

Once digital content has been pinned/tacked to a server (in this case, cloud storage server A 720), the digital content can be accessed from any of the user's computing devices (laptop, tablet, personal computer, etc.) by simply logging into the cloud storage server A 720 as they normally would, utilizing their username and password associated with the cloud storage account.

Now that cloud storage server A 720 has been connected directly with the PINApp running on laptop 710, the pinning/tacking of additional content to cloud storage server A 720 can begin. As with the example above, the user running the PINApp on laptop 710 will provide detailed information to the host server (cloud storage server A 720) containing file and folder addressing, permission, access and other information about the digital content stored on the secondary cloud storage services (cloud storage server B 725, cloud storage server C 730, and cloud storage server D 735). Once all of the subsequent server information as listed above has been shared between the PINApp on the laptop 710 and the host cloud storage server A 720, the pinning/tacking process for the cloud storage services (listed above) is completed. At this point, if the user were to log into cloud storage server A 720 utilizing any of their computing devices (such as a tablet 775), the cloud storage user interface 740 representing the contents of cloud storage server A 720 would list cloud storage (server) B 750 contents as a folder, cloud storage (server) C 755 contents as a folder and cloud storage (server) D 760 contents as a folder in addition to the existing cloud storage (server) A 745 contents as a folder. Each of the above referenced folders would be shown in the cloud storage user interface 740 (representing the contents of cloud storage server A 720) and would be listed as folders of the main directory cloud storage (Cloud Storage A:/> as listed in reference 740). Since cloud storage server A 720 is serving as the host in the above unification example, all subsequent storage locations (including laptops, personal computers, folders, directories, external hard drives, USB sticks and other storage devices and/or locations) will be listed as (and shown in the user interface as) folders contained within the host. In the above example (referencing cloud storage user interface 740), each of the pinned/tacked cloud services (cloud storage B 750, cloud storage C 755 and cloud storage D 760) appear as folders within the host or primary (Cloud Storage A:/> as listed in reference 740) directory.

It's also important to note in the above example of pinning/tacking multiple cloud storage services to a single host service that none of the digital content stored on any of the servers (cloud storage server B 725, C 730 or D 735) has been transmitted to, copied to or otherwise moved to the host cloud storage server (A 720). All of the digital content will remain on their respective servers and in their respective locations. The PINApp unified the contents by providing specific detailed location, addressing, routing and other information about the digital contents of each cloud server, to the host cloud storage server (A 720). This information allows the host cloud storage server (A 720) to access and list the contents of each of the storage locations (cloud storage server B 725, C 730 or D 735) as if they were actually hosted on cloud storage server A 720. As stated above, the cloud storage user interface 740 (as accessed and viewed from tablet 775 as an example) would show the contents of all cloud storage servers (A 720, B 725, C 730 and D 735) on a single user interface. The remaining information (pinned laptop folder 765 and pinned USB external hard drive folder 770) will be explained below.

Now that all of the public cloud servers listed above have been unified under cloud server A 720, we can now unify the remaining devices. The laptop 710 has a user folder 715 that the user also wishes to pin/tack to cloud server A 720. As stated previously, once a folder, drive or server is pinned/tacked, it will be available for access from the primary server user interface. In this example, we've utilized cloud storage server A 720 as our primary.

The user indicates through the PINApp running on laptop 710 that they wish to pin/tack folder 715 to the host cloud storage server (A 720). The PINApp engages the cloud storage A public API 722 and provides detailed information pertaining to folder 715 (residing on laptop 710), including folder name, type, addressing, file and content information and other necessary information to allow the host cloud storage server (A 720) to access the folder 715. Once the folder 715 details have been shared with the host cloud storage server (A 720), the folder will appear when the user accesses the cloud storage server A 720 user interface. Reference 740 is a representation of the user interface for cloud storage server A 720. As can be seen in reference 740, pinned/tacked laptop folder 765 (a representation of the actual laptop folder 715 hosted on the laptop 710) is shown in the directory listing of the user interface (740). As items are added to, or removed from the interconnected devices in this example, the user interface 740 will update to reflect those changes. This includes renaming of files, folders and other activities which would cause the original contents hosted on their respective devices to change.

Finally (referring to FIG. 7), we have an external hard drive 705 connected to the laptop 710. As with the other devices, the user wishes to pin/tack the external hard drive 705 to the host cloud storage server (A 720). As the user notifies the PINApp hosted on the laptop 710 to pin/tack the external hard drive 705 to the cloud storage server A 720, the PINApp once again initiates a connection and opens communication with the cloud storage A public API 722. The PINApp again shares detailed information pertaining to the digital contents stored on the external hard drive 705. This includes (but is not limited to) folder & file names, types, digital location, access and addressing information and other detailed information that enables the digital content stored on the external hard drive 705 to be accessed from the cloud storage server A 720 user interface screen (as depicted by reference 740 cloud storage user interface). As can be seen in reference 740 cloud storage user interface (listing the contents of cloud storage server A 720), the pinned/tacked USB external hard drive folder 770 represents the digital contents of the physical external hard drive 705.

As with other drives and storage locations referenced in FIG. 7 (above), the pinned/tacked USB external hard drive folder 770 shown in the cloud storage user interface 740 is listed as a folder within the primary storage directory, (Cloud Storage A:/> as listed in reference 740). Here again, the screen user interface (depicted by reference 740 cloud storage user interface) can be accessed with any device that the user typically utilizes to access cloud storage server A 720. These devices (including the tablet 775 shown in the reference) do not need to be running the PINApp. Once the digital content is pinned/tacked, the digital content will be accessible from the user interface screen of the host cloud storage server (in this case cloud storage server A 720) that the digital content was pinned/tacked to.

Should the laptop 710 be turned off, disabled, or otherwise become disconnected from the network, all items that were pinned/tacked from the laptop 710 will become inaccessible until the PINApp is once again initiated and is connected to the Internet. The directories, folders and other listings created by the PINApp (as shown in 740 cloud storage user interface) will remain, but they will be inaccessible until the PINApp is restored. This is done to protect the digital content pinned/tacked while using the PINApp.

It's important to note that the above examples and references utilized in FIG. 7 (above) assumed that entire cloud services and entire drives (as with external hard drive 705) were being pinned/tacked to a host location. The user, at their discretion, can choose to pin/tack a single folder or single directory to any of their public cloud storage services. The process would be the same as depicted above.

Unifying the digital content stored on multiple devices and cloud storage platforms allows easy access to digital content from any device that is capable of engaging the cloud platform the digital content is pinned/tacked to.

What is claimed is:

1. A data storage access and retrieval method performed by one or more processors comprising:
   receiving access information for one or more remote files stored at a remote data storage service from a user;
   verifying the access information with the remote data storage service;
   receiving an identifier of one or more local files stored on a local storage device;
   determining address information for one or more communication devices connected to one or more processors, the address information comprising a first address;
   transmitting the address information and the identifier of the one or more local files to the remote data storage service, wherein the one or more local files themselves are neither transmitted to nor stored on the remote data storage service;
   after the access information is verified, instructing the remote data storage service to display a listing of the one or more local files along with the one or more remote files, wherein the remote data storage service is at a second address;
   receiving a request for a subset of the one or more local files from the user at a third address, wherein the request is first directed to the remote data storage service at the second address and subsequently redirected to the one or more processors at the first address; and
   upon receipt of the request, transmitting at least one of the one or more local files to the user at the third address from the local data storage device;
   wherein the local storage device, the one or more communication devices and the one or more processors are in a single unitary user device that is physically remote from the remote data storage service.

2. The data storage access and retrieval method of claim 1 further comprising determining routing information of the one or more communication devices.

3. The data storage access and retrieval method of claim 2 further comprising transmitting the routing information to the remote data storage service along with the address information.

4. The data storage access and retrieval method of claim 1, wherein the local storage device is a removable storage device.

5. The data storage access and retrieval method of claim 1, wherein the user is at a device having a third address distinct from the first address and the second address.

6. The data storage access and retrieval method of claim 1, wherein the listing of the one or more files is displayed to the user via a web interface generated by the remote data storage service.

7. The data storage access and retrieval method of claim 1 further comprising storing the listing of the one or more files in a database on the local storage device.

8. A data storage access and retrieval method performed by one or more processors comprising:
   determining address information for a communication device connected to the one or more processors, the address information comprising a first address;
   transmitting the address information and a listing of one or more files available on a data storage device to a remote data storage service, wherein the one or more files themselves are neither transmitted to nor stored on the remote data storage service;
   instructing the remote data storage service to display the listing of one or more files when accessed by a user, wherein the remote data storage service is accessed at a second address;
   receiving at the communication device a request for at least one file in the listing of one or more files from the user at a third address, wherein the request is first directed to the remote data storage device at the second address and subsequently redirected to the one or more processors at the first address;
   upon receipt of the request, transmitting at least one of the one or more files to the user at the third address from the data storage device; and
   receiving access information for the remote data storage service from the user and verifying the access information with the remote data storage service, wherein the access information is verified before instructing the remote data storage service to display the selection of one or more files;
   wherein the data storage device, the communication device and the one or more processors are in a single unitary user device that is physically remote from the remote data storage service.

9. The data storage access and retrieval method of claim 8, wherein the data storage device is local data storage device connected to the one or more processors via a local bus.

10. The data storage access and retrieval method of claim 8, wherein the data storage device is a remote data storage device connected to the one or more processors via a network.

11. The data storage access and retrieval method of claim 8, wherein the user is at a device having a third address distinct from the first address and the second address.

12. The data storage access and retrieval method of claim 8 further comprising determining routing information between the communication device and the remote data storage service, and transmitting the routing information to the remote data storage service along with the address information.

13. The data storage access and retrieval method of claim 8, wherein the one or more processors are installed in a computing device selected from the group consisting of laptops, desktops, smartphones, PDAs, media players, game consoles, and servers.

* * * * *